April 10, 1945.  S. B. GRIMSON  2,373,243
CAMERA MECHANISM
Filed May 6, 1943  3 Sheets-Sheet 1

INVENTOR
SAMUEL B. GRIMSON
BY Darby & Darby
ATTORNEYS

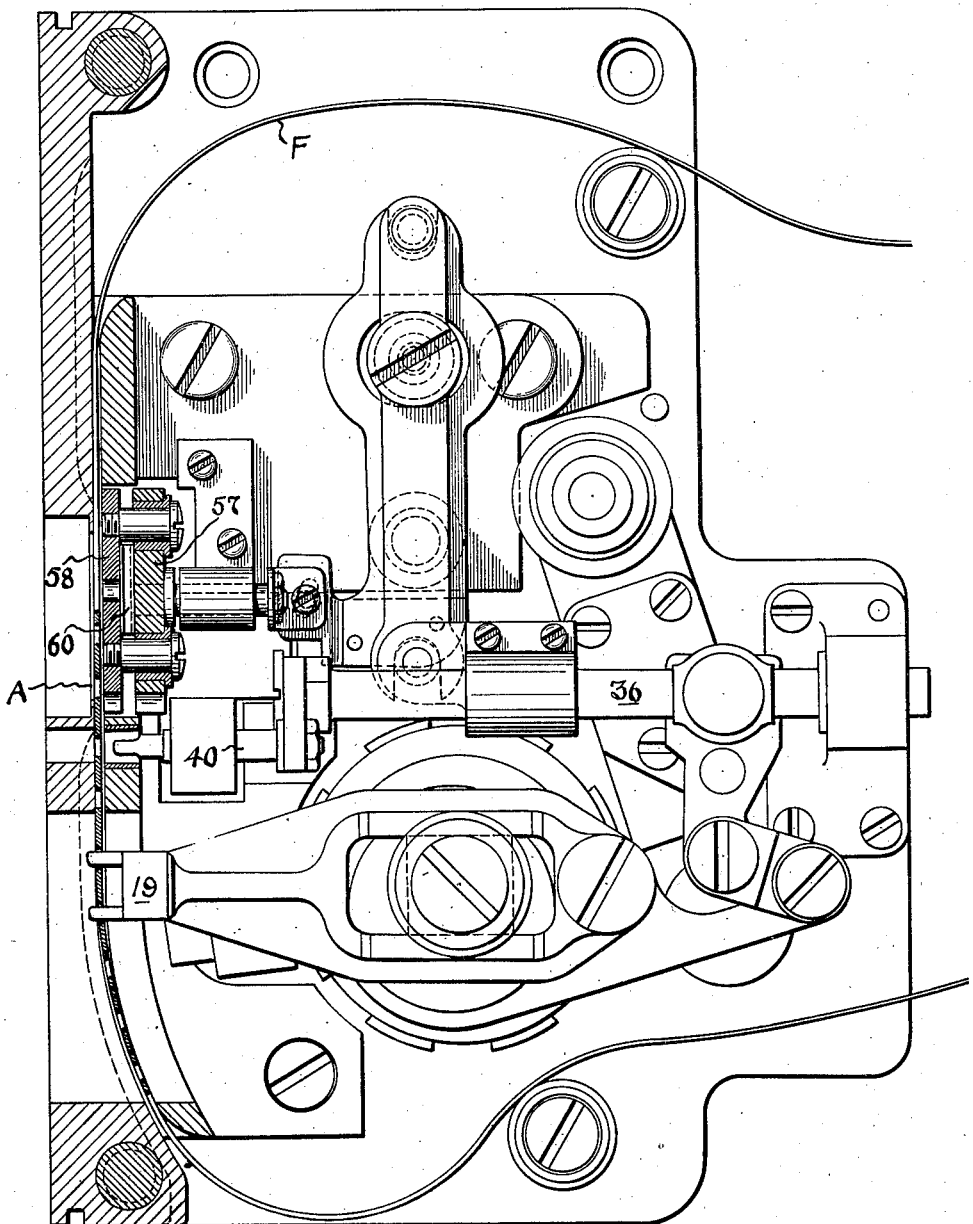

April 10, 1945.　　　S. B. GRIMSON　　　2,373,243
CAMERA MECHANISM
Filed May 6, 1943　　　3 Sheets-Sheet 3
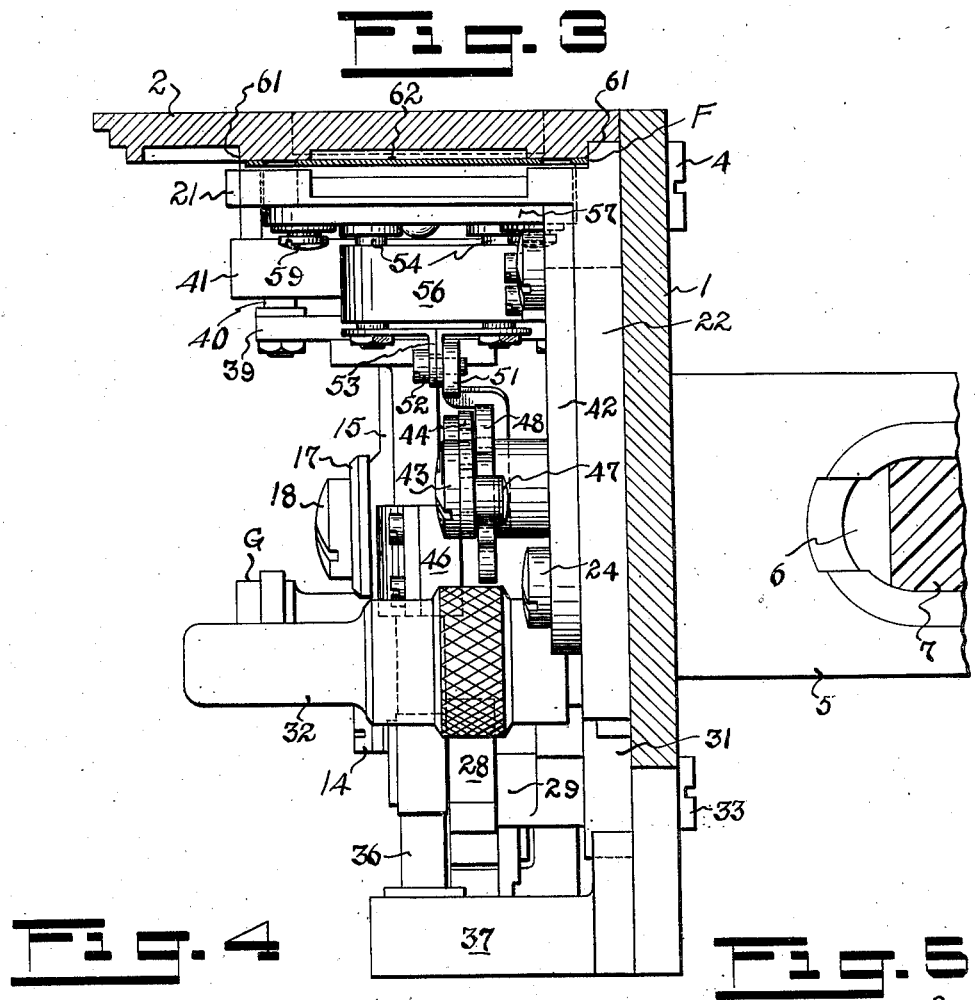
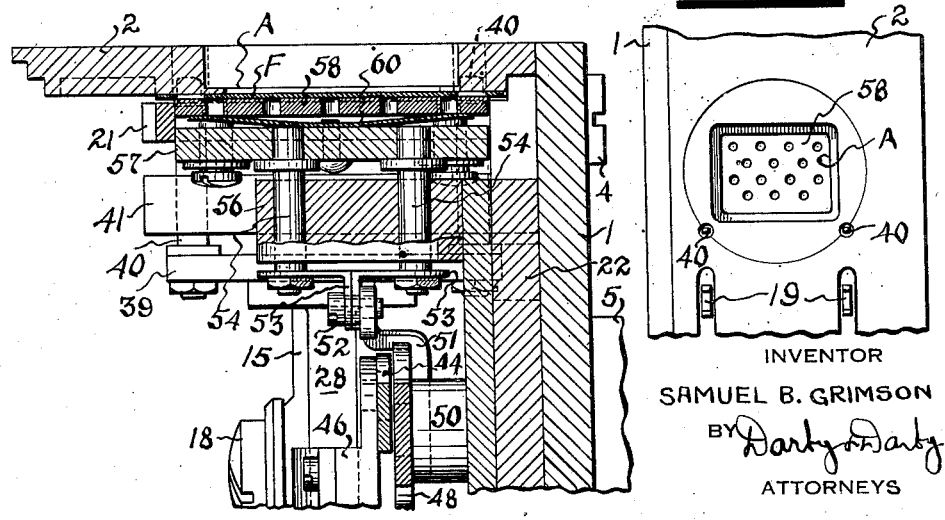
INVENTOR
SAMUEL B. GRIMSON
BY Darby & Darby
ATTORNEYS

Patented Apr. 10, 1945

2,373,243

UNITED STATES PATENT OFFICE 2,373,243

CAMERA MECHANISM

Samuel B. Grimson, New York, N. Y., assignor to Color Research Corporation, New York, N. Y., a corporation of Delaware Application May 6, 1943, Serial No. 485,807

5 Claims. (Cl. 88—18.4)

This invention relates to improvements in that part of a motion picture camera comprising a pressure plate or the like for holding the film stationary and flat at the aperture of the aperture plate during exposure.

The main object of this invention is to provide an improved form of pressure plate actuating mechanism for use in motion picture cameras and especially motion picture cameras to be used in the making of colored motion pictures.

A more specific object of this invention is to provide a reciprocable pressure plate actuated by and in timed relation with the film pull-down mechanism of a motion picture camera, whereby the film is clamped at the aperture, during exposure, so as to lie in an absolutely flat plane, for use particularly in the taking of colored pictures, and more specifically in taking colored pictures in a specialized process, where extreme accuracy of register and flatness of the film during exposure is required.

A still more specific object of the invention is to provide an operating mechanism and such a pressure plate as a part of the Mitchell camera, now extensively used in taking sound motion pictures.

Another object of the invention is to provide a device of this type which is extremely quiet, indeed substantially noiseless in operation.

Other and more detailed objects of the invention will be apparent from the following description of the embodiment thereof illustrated in the attached drawings.

This invention resides substantially in the combination, construction, arrangement and relative location of parts, all as will be described in detail below.

In the accompanying drawings,

Figure 2 is a view similar to Figure 1 showing the pressure plate released as distinguished from Figure 1, in this respect, where the pressure plate is in applied position;

Figure 3 is a cross-sectional view taken on the line 3—3 of Figure 1;

Figure 4 is a cross-sectional view taken on the line 4—4 of Figure 1, showing the aperture symmetrically placed with respect to the runners; and Figure 5 is a detail view showing the aperture plate, from the front, in the region of the aperture.

Figure 1:
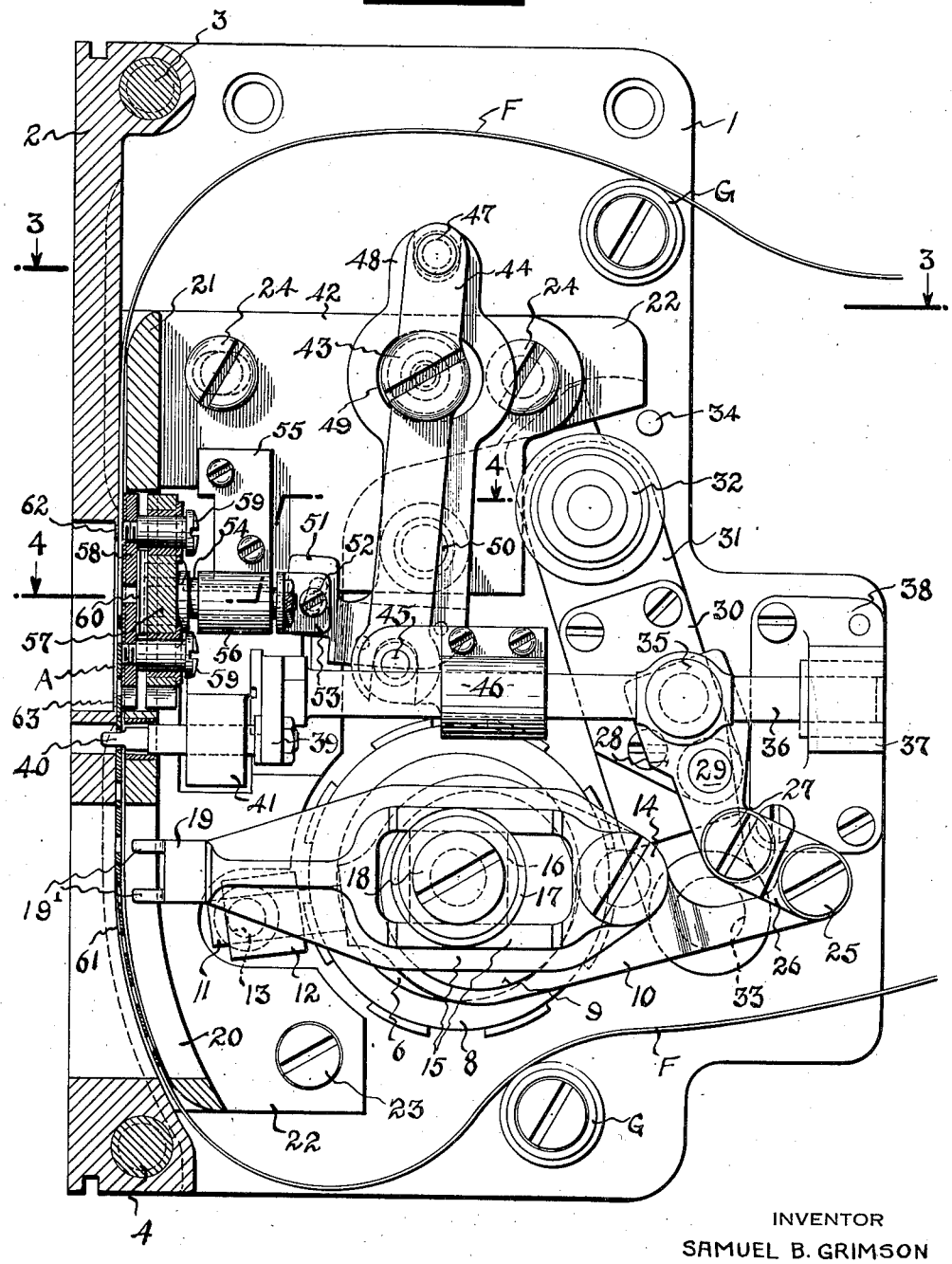
Figure 1 is a side elevational view partly in vertical cross-section of the film pull-down mechanism of a Mitchell camera showing the pressure plate of this invention and its operating mechanism; illustrating its actuation in proper timed relation with and by the pull-down mechanism.

The subject matter of this invention comprises a pressure plate and its actuating mechanism, as described, for use with and as a part of a Mitchell camera film pull-down or feeding device. The Mitchell mechanism as now used commercially and to which the subject matter of this invention is applied is disclosed in United States Patent No. 1,930,723 issued October 17, 1933, to Martin A. Mitchell.

In the Mitchell camera, as now commonly employed, the pressure plate at the film aperture consists essentially of a supporting plate positioned opposite the aperture on which is mounted a plurality of rollers which extend transversely of the direction of movement of the film and are of sufficient length so as to clamp the perforated side edges of the film against the surface of the aperture plate along which the film travels. In this camera the aperture plate on the film side above and below the aperture is relieved so that the film does not touch the aperture plate and is, therefore, not scratched as it moves. In other words, the film moves past the aperture in engagement with the adjacent face of the aperture plate along two raised bands at the sides of the aperture, but is out of contact with the aperture plate at all other portions. The clamping rollers and their support do not move as the film is pulled down, although, of course, the rollers are free to revolve as it moves, so that their contact with the film is a rolling contact. This arrangement is entirely satisfactory for the simultaneous recording of pictures and sound because the mechanism is quiet, and for ordinary purposes, the roller pressure plate holds the film at the aperture in a sufficiently flat condition. A further difficulty with this and some other stationary pressure plate cameras is in the tendency for emulsion to pile on the surface of the runners, requiring frequent removal and cleaning of the aperture plate.

However, for certain specialized methods of picture recording, and particularly in the recording of color by some methods, it becomes necessary to hold the film in as nearly a perfectly flat plane as is possible, and it has been found that the roller type of pressure plate is not suitable for the purpose, partly because the film is unsupported at the top and bottom of the aperture, as previously explained.

In accordance with this invention, the region of the aperture plate at the top and bottom of the aperture, as well as at the sides, all lie in a single plane and the clamping plate engages the film throughout the area of each frame, as it is exposed, and clamps the portion surrounding the exposure area against the aperture plate on all sides of the aperture. With this arrangement, provision must be made for releasing the pressure plate during the periods of movement of the film in order that the film will not be dragged across the clamping areas at the top and bottom of the aperture, thereby preventing scratching of the areas of each frame upon which the picture is to be exposed.

It follows, therefore, that the pressure plate must move rapidly into and out of engagement with the film in synchronism with the operation of the pull-down mechanism, so that the pressure plate is released while the film is in motion and is in clamped position while the film is at rest. The subject matter of this invention is concerned with such a movable pressure plate and the operating mechanism therefor, designed for incorporation in a Mitchell film feeding mechanism for operation thereby.

An important object of the invention is to provide such a mechanism which will be silent. The mechanism herein disclosed is substantially noiseless and yet employs a reciprocating pressure plate of the type indicated above. It is believed that this represents a distinct advance in the art in view of the fact that well known prior art cameras using a reciprocating pressure plate had to be abandoned when recording sound motion pictures, and were in fact in a large measure displaced by the Mitchell camera because of the excessive noise created by them when operating.

In the drawings the film pull-down or feeding mechanism of the Mitchell camera, as now used, is illustrated in cooperative relationship with the reciprocating pressure plate and the mechanism for operating it from the film feeding mechanism. As illustrated, the aperture plate 2, is attached to the supporting plate 1 by means of machine screws 3 and 4 so that these two plates are held in a right angle relationship, as is clear for example from Figure 3. The aperture comprises the opening A at the inner side of an outwardly opening enlarged recess provided as a seat for an element forming a part of a specialized mechanism and process which necessitated the development of the subject matter herein disclosed. Attached to the outside of plate 1, as appears from Figure 3, is a post or hub 5 in which is journaled a shaft 6, to which a helical gear 7 is attached. Driving power for the mechanism is applied to shaft 6 and other parts of the apparatus not here shown are driven by the gear 7, all as is well known with devices of this type. The inner end of shaft 6 appears in Figure 1 and is enclosed by and journaled in a removable cap 8. At the end of shaft 6 is an eccentric disc 9 on which is mounted an oscillatory yoke 10 which is provided with a radially extending pin 11 slidably engaging a guide block 12 mounted for oscillatory movement on the plate 1 by means of a pivot pin 13.

Pivotally mounted on the yoke 10 by means of a pivot screw 14 is an arm 15 which has an elongated slot extending therethrough within which it is slidably engaged by a block 16 pivotally mounted on a pivot screw 18 attached to the face of the eccentric disc 9 and eccentric with respect both to the disc and the shaft 6. A bearing washer 17 engages the finished face of the yoke 15 and lies between it and the screw 18. The left hand end, Figure 1, of the arm or yoke 15 forms the film engaging claw 19, which is so shaped that a pair of sprocket hole engaging fingers 19' are provided at each side of the film (see Figure 5). These fingers operate in vertical slots 20 in a guide plate 21 which is mounted in back of the aperture plate A and spaced a short distance therefrom to define a vertical channel through which the film may move freely in a lengthwise direction. This plate, which in the regular Mitchell mechanism supports the roller pressure plate, is integral with a right angle base plate 22 attached to the inner face of the plate 1 by means of screws 23 and 24 (see Figure 1). The guide plate 21 is provided with an enlarged aperture in line with the aperture A of the aperture plate.

The eccentric yoke 10 is provided with a rearwardly extending tail piece upon which the pivot screw 25 is mounted to provide a pivotal support for a short link 26 which is bifurcated to receive on the pivot screw 27 the end of a short lever 28. The lever 28 is pivoted intermediate its ends on the pivot pin 29 which is mounted on a supporting plate 30 detachably secured to a lever 31. This lever 31 is provided with a longitudinally movable button or finger piece 32 which is held by a spring, not shown, in the position shown in Figure 3, in which position a pin engages the base plate 1 and holds the lever 31 in the position shown in Figure 1. The lever 31 is pivotally mounted on a pivot pin 33 supported on the base plate 1. As is well known with regard to this mechanism, the lever 31 is thrown from the position shown in Figure 1 towards the right against a stop pin 34 for further withdrawing the pins 40 for convenience in threading-up the camera.

The upper end of the lever 28 is pivotally connected by the pivot pin 35 to a rod 36 which is slidably mounted at the right hand end in a bracket 37, the base 38 of which is attached by screws to the base plate 1. The other end of the rod 36 is provided with a crossbar 39 which extends laterally in both directions, as is clear from Figures 3 and 4, and to the ends of which are attached the film registration pins 40. These registration pins operate through aligned apertures in the guide plate 21 and aperture plate 2. These apertures are positioned so that the sprocket perforations of the film may register therewith, as is well known in the art. The pins 40 are slidably mounted in a bracket 41 secured to the base plate 1. Thus the shaft 36 is supported at both ends for reciprocatory movement in a longitudinal direction.

The mechanism so far described comprises the Mitchell camera film feeding mechanism minus the roller pressure plate and by itself constitutes no part of this invention. The mechanism is well known and is in actual commercial use, and a detailed description of how it operates does not therefore seem necessary. It should suffice to state that the claw 19 has a compound oscillatory and reciprocatory movement which causes it to engage the sprocket perforations from a position in Figure 1 to the position in Figure 2 to draw the film down a distance of one frame and then to withdraw from the film and return back to the position shown in Figure 1, during which period the film is stationary and a frame is exposed. Operating in proper timed relation therewith the registration pins 40 are withdrawn just prior to the time that claw 19 starts the downward movement of the film and re-enter the sprocket perforations just at the end of the film movement so as to accurately position the film in the aperture.

In accordance with this invention it is desired to provide a pressure plate which it will operate in conjunction with the mechanism previously described and will clamp the film about the entire periphery of the aperture during exposure while releasing the film during the period that it is being pulled down. The added mechanism, comprising the subject matter of this invention, has been shaded in Figure 1 to distinguish it from the parts previously described. It includes a plate 42 which overlies the plate 22 and is held in position by the screws 24, so that both of these plates are attached to the base plate 1, by means of the screws 24. Mounted on a pivot screw 43, which is supported by the plate 42, is a double ended lever 44 having a forked lower end, engaging a roller on a pin 45 mounted on the bracket 46 clamped to the shaft 36. The upper end of the lever 44 is provided with a pin 47 engaging the forked end of a lever 48 which is pivotally mounted intermediate its ends on a pivot pin 50 attached to the plate 42. The lever 48 is provided with an enlarged opening 49 in which the pivot pin 43 lies. This opening is of such size and shape as to permit oscillation of the lever 48 on the pivot pin 50. The lower end of lever 48 is provided with a lateral extension 51 having a slot therein in which a screw 52 engages. This screw is mounted upon a T-shaped arm 53, the shape of which is clear from Figure 4. The arm 53 has attached to it near its ends a pair of rods 54 which are slidably mounted in a guide bar 56, attached by means of a bracket 55 to the plate 42. The pins 54 are fastened to a plate 57 and support it for reciprocation to and from the aperture plate, in the opening in the guide plate 21. Mounted upon the supporting plate 57 by means of four screws 59 is a perforated pressure plate 58. Between these two plates is a flat spring 60 (Figure 4) which normally tends to hold the plates in separated position, as clearly shown in Figure 2.

The film which is shown at F engages the aperture plate in the region of its sprocket perforations on guiding surfaces 61 (see Figure 3) which extend vertically of the aperture plate and over which the film slides when it moves. In accordance with this invention and as distinguished from the arrangement when the roller type of pressure plate is used, the aperture plate is built up at the top and bottom of the aperture as shown at 62 and 63, Figure 1, so as to provide contact surfaces in the plane of the guides 61 across the top and bottom of the aperture. The pressure plate 58 clamps the film not only at the sides of a frame but at the top and bottom thereof. This insures that the film will be held at the aperture in an absolutely flat plane during exposure. In order that the film is not scratched by the surfaces 62 and 63 when it moves, the pressure on the film must be released and this is accomplished by the mechanism disclosed above, as will now be explained in more detail by describing the operation of the mechanism. It is noted that the rotatable guides G are employed as is usual with mechanism of this type.

As previously mentioned briefly, the registration pins 40 and the pull-down claw 19 operate in such relationship that the pins release the film at the instant the claw starts the film in its downward movement and re-engages the film at the end of its movement. The claw 19 has a combination oscillatory and rotational movement such that the claw fingers 19' move in a substantially horizontal direction from the position shown in Figure 1 into the position shown in Figure 2 before they begin their rotary movement which causes them to move downwardly while slowly retracting so as to define a path similar to that in which the film lies, as shown in Figures 1 and 2. At the end of their downward movement they are withdrawn and returned back to the position shown in Figure 1.

The pressure plate of this invention should have a movement quite similar to that of the registration pins and in about the same timed relation. The pressure plate should be moved back to the position shown in Figure 2 at the time the registration pins 40 are withdrawn and at which time the claw is moving the film. At the end of the film movement the pressure plate returns to the position shown in Figure 1 at the time the pins 40 are also moving to the position shown in the same figure. The pressure plate has a much smaller distance to move than do the registration pins, and indeed the total movement of the pressure plate is of the order of about fifteen-thousandths of an inch. This movement is secured from the reciprocating rod 36 which has a great deal longer stroke. A double reduction movement is effected by means of the plural lever arrangement illustrated so that while the rod 36 is making its normal full stroke the pressure plate is moved thereby through the reducing leverage system a distance no greater than about fifteen-thousandths of an inch. The contact plate 58 of the pressure mechanism does not have as great a movement as does the backing or supporting plate 57 because of its sliding connection therewith on the pins 59. Thus as the backing plate 57 recedes during the first part of this stroke the actual pressure or contact plate 58 remains against the film but with a gradually reducing pressure as the tensed spring 60 is relieved. When the supporting plate 57 engages the heads of the pins 59, as shown in Figure 2, the relative movement between the plates 57 and 58 is stopped and they move together. Thus the actual contact plate 58 has a considerably less movement than does the backing plate 57. On the return stroke when the pressure is being applied to the film very shortly after movement of the backing plate 57 begins the contacting plate 58 engages the film and from there on the further movement of the backing plate 57 tenses the spring 60, increasing the pressure of the plate 58 on the film. This arrangement insures that no noise will be generated by the mechanism even though it is operating, when in use, at a high rate of speed, as those skilled in the art will appreciate. The contact plate 58 is shown perforated so as to prevent a pumping action or to prevent the trapping of any air behind the film.

As previously explained, the film when clamped lies between the contact plate 58 and the plateau comprising the sides 61, the top 62 and the bottom 63 surrounding the aperture so that the film is clamped around the entire periphery of each frame during exposure against a very flat plate. Thus the film is for all intents and purposes in an absolutely flat plane during exposure.

From the above description it will be apparent to those skilled in the art that the subject matter of this invention is capable of embodiment in physical forms other than that reproduced herein for illustrative purposes. I do not, therefore, desire to be strictly limited to the disclosure but rather by the claims granted me.

What is claimed is:

1. In combination with a Mitchell camera feeding and registering mechanism, the combination with an aperture plate, a film feeding device, longitudinally reciprocable registration pins and means for effecting movement of the feeding mechanism and registering pins in timed relation, of a clamping plate for engaging the film throughout the periphery of the aperture, means for supporting said clamping plate opposite the aperture in said aperture plate, lever means interconnecting said clamping plate with said mechanism, whereby the clamping plate is moved into and out of clamping engagement with the aperture plate in timed relation with said mechanism, said lever means comprising a lever pivotally mounted intermediate its ends and connected at one end to the registration pins, forming part of the registering mechanism, a second lever pivotally mounted intermediate its ends and connected at one end to said aperture plate, and means for connecting the other ends of said levers together.

2. In a silent motion picture film feeding mechanism the combination with an aperture plate, longitudinally reciprocable registering pins, a pressure plate supported for reciprocatory parallel movement with respect to said aperture plate, and means for reciprocating said registering pins of, a motion reducing two-way positive drive connection between said pin reciprocating means and said pressure plate to impart a timed movement to said pressure plate which is a fraction of the movement of said pins and of about the same duration.

3. In the combination of claim 2, said pressure plate including a support, a film engaging plate slidably mounted thereon, and resilient means interposed therebetween.

4. In the combination of claim 2, said pressure plate including a support, a film engaging plate slidably mounted thereon, and resilient means interposed therebetween, said aperture plate being undercut at the aperture to provide a film seat surrounding the aperture and lying in a relatively elevated single plane.

5. In the combination of claim 2, said motion reducing positive drive connection comprising a lever pivotally mounted intermediate its ends and positively connected at one end to said pin reciprocating means, a second lever pivotally mounted intermediate its ends and positively connected at one end to said pressure plate, and means connecting the other ends of said levers together.

SAMUEL B. GRIMSON.